United States Patent
Ji et al.

(10) Patent No.: US 12,546,487 B2
(45) Date of Patent: Feb. 10, 2026

(54) AIR CONDITIONER, CONTROL METHOD FOR AIR CONDITIONER, AND COMPUTER-READABLE STORAGE MEDIUM

(71) Applicant: GD MIDEA AIR-CONDITIONING EQUIPMENT CO., LTD., Guangdong (CN)

(72) Inventors: Ansheng Ji, Guangdong (CN); Shunkai Du, Guangdong (CN); Qiwei Liu, Guangdong (CN); Guojian Cai, Guangdong (CN); Jian He, Guangdong (CN); Shaosheng Guo, Guangdong (CN); Fuxing Zhai, Guangdong (CN)

(73) Assignee: GD MIDEA AIR-CONDITIONING EQUIPMENT CO., LTD., Guangdong (CN)

(*) Notice: Subject to any disclaimer, the term of this patent is extended or adjusted under 35 U.S.C. 154(b) by 726 days.

(21) Appl. No.: 17/876,919

(22) Filed: Jul. 29, 2022

(65) Prior Publication Data

US 2022/0364741 A1 Nov. 17, 2022

Related U.S. Application Data

(63) Continuation of application No. PCT/CN2020/082265, filed on Mar. 31, 2020.

(30) Foreign Application Priority Data

Feb. 26, 2020 (CN) .......................... 202010120978.7

(51) Int. Cl.
*F24F 1/0011* (2019.01)
*F24F 11/64* (2018.01)
(Continued)

(52) U.S. Cl.
CPC ............ *F24F 1/0011* (2013.01); *F24F 11/64* (2018.01); *F24F 11/79* (2018.01); *F24F 13/1413* (2013.01)

(58) Field of Classification Search
CPC .......... F24F 11/082; F24F 11/79; F24F 13/12; F24F 13/20; F24F 1/0011; F24F 1/0088;
(Continued)

(56) References Cited

U.S. PATENT DOCUMENTS 5,180,333 A * 1/1993 Shyu ........................ F24F 11/56
454/319
5,326,028 A * 7/1994 Kano ...................... G01D 5/26
356/627
(Continued)

FOREIGN PATENT DOCUMENTS

CN 110319547 A 10/2019
CN 110319565 A 10/2019
(Continued)

OTHER PUBLICATIONS

Supplementary European Search Report dated Jun. 20, 2023 received in European Patent Application No. EP 20922012.8.
(Continued)

*Primary Examiner* — Avinash A Savani
*Assistant Examiner* — Dana K Tighe
(74) *Attorney, Agent, or Firm* — Scully, Scott, Murphy & Presser, P.C.

(57) ABSTRACT

An air conditioner, a control method for an air conditioner, and a computer-readable storage medium are provided. The air conditioner has a body, an air outlet, and an air output assembly for adjusting the air output of the air outlet. The air conditioner further has a detection device and a controller. The detection device acquires a distance value of a target object from the air conditioner. The controller is electrically (Continued)

connected to the air output assembly and the detection device, and controls the air output assembly to switch among different operative configurations based on the distance value.

23 Claims, 8 Drawing Sheets

(51) Int. Cl.
*F24F 11/79* (2018.01)
*F24F 13/14* (2006.01)

(58) Field of Classification Search
CPC ... F24F 2013/205; F24F 11/64; F24F 13/1413
USPC .................................................. 454/89, 256
See application file for complete search history.

(56) References Cited

U.S. PATENT DOCUMENTS

| | | | | |
|---|---|---|---|---|
| 8,323,081 | B2 * | 12/2012 | Koizumi | H05B 47/19 454/258 |
| 9,551,541 | B2 * | 1/2017 | Matsumoto | F24F 1/0057 |
| 10,584,894 | B2 * | 3/2020 | Iwano | F24F 11/74 |
| 2021/0247095 | A1 * | 8/2021 | Lee | F24F 11/79 |
| 2022/0299228 | A1 * | 9/2022 | Longo | F24F 1/00 |

FOREIGN PATENT DOCUMENTS

| | | |
|---|---|---|
| CN | 110319569 A | 10/2019 |
| CN | 110454962 A | 11/2019 |
| CN | 209689037 U | 11/2019 |
| CN | 110701772 A | 1/2020 |
| CN | 110715422 A | 1/2020 |
| CN | 110779179 A | 2/2020 |
| EP | 2416074 A2 | 2/2012 |
| JP | 2013-011414 A | 1/2013 |
| JP | 6335425 B2 | 5/2018 |
| WO | 2017101673 A1 | 6/2017 |

OTHER PUBLICATIONS

International Search report dated Nov. 30, 2020 received in International Application No. PCT/CN2020/082265.

* cited by examiner

AIR CONDITIONER, CONTROL METHOD FOR AIR CONDITIONER, AND COMPUTER-READABLE STORAGE MEDIUM

CROSS-REFERENCE TO RELATED APPLICATIONS

This application is a continuation application of PCT International Patent Application No. PCT/CN2020/082265, filed on Mar. 31, 2020, which claims priority to and benefits of Chinese Patent Application No. 202010120978.7 filed with China National Intellectual Property Administration on Feb. 26, 2020 and entitled "Air Conditioner, Control Method For Air Conditioner, and Computer-Readable Storage Medium", the entire contents of which are herein incorporated by reference for all purposes. No new matter has been introduced.

FIELD

The present disclosure relates to the field of air-conditioning technology, and particularly relates to an air conditioner, a method for controlling an air conditioner, and a computer-readable storage medium.

BACKGROUND

In the related art, in order to avoid direct blowing, air conditioners are generally set with a windless feeling mode. In a windless feeling mode, the room as a whole is in a windless feeling state, resulting in a problem that the cooling efficiency is reduced and cannot meet the user's needs.

SUMMARY

The present disclosure aims to solve at least one of the technical problems existing in the prior art or in the related art.

To this end, a first aspect of the present disclosure proposes an air conditioner.

A second aspect of the present disclosure proposes a method for controlling an air conditioner.

A third aspect of the present disclosure proposes a computer-readable storage medium.

In view of this, the first aspect of the present disclosure provides an air conditioner, comprising: an air conditioner body, the air conditioner body being provided with an air outlet; an air output assembly configured to adjust air output of the air outlet, the air output assembly having a plurality of forms; a detection device configured to be suitable for acquiring a distance value of a target object from the air conditioner; and a controller, the controller being electrically connected to the air output assembly and the detection device and controlling, according to the distance value, the air output assembly to switch forms.

In this embodiment, the air conditioner comprises an air conditioner body provided with an air outlet, and through the air outlet, the air after heat exchange with an indoor heat exchanger is blown out to achieve cooling or heating. An air output assembly is provided at the air outlet, and the air output assembly has a plurality of forms and can change the air supply mode by form switching.

In this embodiment, the air conditioner is provided with a detection device which can measure a distance value of a target object from the air conditioner. The target object may be a human body, and may also be a preset object, such as "a bed", "a desk", "a sofa" and other furniture where the human body may stay. The air output assembly is controlled to switch forms according to the distance of the target object from the air conditioner, allowing the region where the "target object" is located to be in a windless feeling state, thus ensuring that air will not "blow directly" on a person's body, improving the comfort of the air conditioner. Meanwhile, in a region outside the region where the target object is located, the volume of air blowing can be increased by means of "direct blowing" or other modes, thereby improving cooling or heating efficiency under the condition of guaranteeing the person's need to not feel the air blowing, and thereby satisfying multiple requirements of the user.

In addition, the air conditioner in the above embodiment provided in the present disclosure may also have the following additional technical features.

In the above embodiment, the plurality of forms include a first form, and the air conditioner further comprises: a communication interface electrically connected to the controller and configured to receive a control instruction; and the controller controls, according to the control instruction, the air output assembly to work in the first form.

In this embodiment, the first form is a default windless feeling form. After being turned on, the air conditioner runs in an ordinary cooling mode or an ordinary heating mode by default, and the windless feeling mode is not activated at this time. When the air conditioner receives a corresponding control instruction, which is a windless feeling control instruction, through the communication interface, the air conditioner enters the default windless feeling state, and the room as a whole is in the windless feeling state at this time, ensuring, to the greatest extent, that the human body will not be "blown directly" by the cold air of the air conditioner.

In any of the above embodiments, the plurality of forms further include a second form and a third form, and the controller controlling, according to the distance value, the air output assembly to switch forms can comprise: acquiring a first preset distance range and a second preset distance range; determining that the distance value is within the first preset distance range and controlling the air output assembly to switch to the second form; and determining that the distance value is within the second preset distance range and controlling the air output assembly to switch to the third form.

In this embodiment, the second form is a windless feeling front-side distribution state, and the corresponding first preset distance is a range of distance relatively close to the air conditioner. In the second form, the air conditioner supplies air to the range of the first preset distance in the windless feeling mode, and at the same time supplies air to the range of the second preset distance in a relatively large air volume.

The third form is a windless feeling lower-side distribution state, and the corresponding second preset distance is a range of distance relatively far from the air conditioner. In the third form, the air conditioner supplies air to the range of the second preset distance in the windless feeling mode, and at the same time supplies air to the range of the first preset distance in a relatively large air volume.

By controlling the air output assembly to switch between different air supply states according to the distance of the target object, it is possible to effectively improve the cooling or heating efficiency and thus enhance the use experience of the air conditioner, while ensuring that the human body "does not feel the air blowing".

In any of the above embodiments, the air output assembly comprises: a first air deflector provided in the air outlet, the first air deflector is suitable for rotating relative to an orientation of the air outlet to change an air output direction of the air outlet; a second air deflector rotatably connected to the air conditioner body and configured to open or close the air outlet, the second air deflector being provided with through holes for airflow to pass through; and an air diffusing assembly connected to the air conditioner body and suitable for moving relative to the air conditioner body to shield or open the air outlet, the air diffusing assembly being formed with an air diffusing structure, and the air diffusing structure being suitable for allowing air flow to pass through and diffusing the passing air flow.

In this embodiment, the air output assembly comprises a first air deflector, a second air deflector and an air diffusing assembly. The first air deflector is disposed in the air outlet and can rotate along an axis parallel to the air outlet, so as to change the air output direction of the air outlet to achieve "long-distance" air supply or "short-distance" air supply. The second air deflector is used for opening or closing the air outlet. For example, when the air conditioner is turned off, the second air deflector covers the air outlet; and when the air conditioner is turned on, the second air deflector rotates relative to the air conditioner body and opens the air outlet. Moreover, the second air deflector is provided with a plurality of through holes, and after passing through the through holes, the airflow is broken up into a plurality of small staggered airflows.

The air diffusing assembly can move relative to the air conditioner body. When the windless feeling mode is not activated, the air diffusing assembly is received in the air conditioner body. After the windless feeling mode is activated, the air diffusing assembly extends out to abut against one end of the second air deflector and shield the air outlet. The air diffusing assembly is further provided with an air diffusing structure. Through the air diffusing structure, the airflow passing through the air diffusing assembly can be broken up and dispersed to achieve "windless feeling" and "direct blowing prevention".

In any of the above embodiments, the air diffusing structure comprises: a plurality of wind wheels, the plurality of wind wheels being meshed and driven by a gear structure, the wind wheel comprising an inner rib and an outer ring rib, first blades and second blades being provided between the inner rib and the outer ring rib, the first blades being fixedly connected to the inner rib and the outer ring rib, the second blades being rotatably connected to the inner rib, and the second blades having a first operative position and a second operative position; wherein when the second blades are in the first operative position, the second blades and the first blades are arranged at intervals; and when the second blades are in the second operative position, at least part of the second blades coincide with the first blades in an axial direction of the wind wheel.

In this embodiment, the air diffusing structure comprises a plurality of wind wheels, and the plurality of wind wheels are meshed and driven by a gear structure and rotate under the driving of a motor to disperse the airflow passing therethrough. The wind wheel comprises an inner rib and an outer ring rib, and first blades and second blades are provided between the inner rib and the outer ring rib. The first blades are static blades, which are fixedly connected to the outer ring rib and the inner rib. The second blades are dynamic blades, and can rotate with the inner rib as a rotation shaft and switch between the first operative position and the second operative position.

When the second blades rotate to the first operative position, the second blades and the first blades are arranged at intervals, and the blades of the wind wheel are distributed "relatively densely" at this time, so the velocity of the airflow through the wind wheel is relatively low, leading to a relatively strong "windless feeling" effect. When the second blades rotate to the second operative position, at least part of the second blades coincide with the first blades, and the blades of the wind wheel are distributed "relatively thinly" at this time, so the velocity of the airflow through the wind wheel is relatively high, leading to a relatively weak "windless feeling" effect and a relatively strong air supply capability.

In any of the above embodiments, the outer ring rib is provided with a positioning portion protruding towards the inner rib, and the second blade is provided with a convex rib corresponding to the positioning portion, the second blade moves to the first operative position, and the positioning portion abuts against the convex rib to limit the second blade.

In this embodiment, the outer ring rib is provided with a protruding positioning portion, and the second blade is provided with a convex rib cooperating with the positioning portion, and when the second blade is controlled to move for position switching, the position of the second blade is limited by the convex rib and the positioning portion to realize positioning.

When the air conditioner is turned off and reset, or when the second blade is switched to the first operative position, the second blade is driven to rotate by a motor until the convex rib abuts against the positioning portion, and the motor locks the second blade.

In any of the above embodiments, the controller controlling, according to a control instruction, the air output assembly to work in the first form can comprise: the controller controlling the air diffusing assembly to shield the air outlet, controlling the second blade to move to the first operative position, and controlling the first air deflector to rotate to a first angle.

In this embodiment, when controlling the air output assembly to switch to the first form, the controller first controls the air diffusing assembly to shield the air outlet to enter the windless feeling mode. After rotating to the first angle, the first air deflector directs the air output of the air outlet mainly to the structure of the air diffusing assembly, and at the same time the second blade of the air diffusing assembly is controlled to move to the first operative position, leading to the strongest windless feeling effect. The first air deflector is controlled to rotate to the first angle.

In any of the above embodiments, the controller controlling the air output assembly to switch to the second form can comprise: controlling the second blade to move to the second operative position, and controlling the first air deflector to rotate from the first angle to a second angle.

In this embodiment, when the air output assembly is controlled to switch to the second form, the position of the air diffusing assembly is maintained, and the first air deflector is controlled to rotate from the first angle to the second angle, at this time, the first air deflector still maintains directing the air output of the air outlet to the air diffusing assembly, but after the first air deflector is adjusted to the second angle, the coverage of the air output direction is the range corresponding to the first preset distance. At the same time, the second blade is controlled to move to the second operative position to increase the volume of air supplied to the range of the first preset distance to improve the cooling or heating effect.

In any of the above embodiments, the controller controlling the air output assembly to switch to the third form can comprise: controlling the first air deflector to rotate from the first angle to a third angle; wherein the first air deflector rotates to the first angle or the second angle, the first air deflector directs the air blown out of the air outlet to the air diffusing assembly; and the first air deflector rotates to the third angle, the first air deflector directs the air blown out of the air outlet to the second air deflector.

In this embodiment, when the air output assembly is controlled to switch to the third form, the first air deflector is controlled to rotate from the first angle to the third angle, and after the first air deflector rotates to the third angle, the first air deflector directs the air output of the air outlet to the first air deflector, i.e., air comes out through the through holes provided in the first air deflector. At the same time, the air diffusing assembly maintains the strongest windless feeling effect, to ensure that the human body within the range corresponding to the first preset distance will not be "blown directly", while increasing the volume of air supplied to the range of the second preset distance, in order to improve the cooling or heating effect.

In any of the above embodiments, the detection device is also suitable for acquiring an ambient temperature, before the controller controls, according to the distance value, the air output assembly to switch forms, the controller acquires a preset difference and a preset temperature, and calculates a first difference between the ambient temperature and the preset temperature; and when determining that the first difference is greater than the preset difference, the controller performs the step of controlling, according to the distance value, the air output assembly to switch forms.

In this embodiment, when the first difference between the ambient temperature and the preset temperature is greater than the preset difference, it indicates that there is a relatively large temperature difference between the current ambient temperature and the comfortable temperature. In order to improve the cooling or heating effect, the step of controlling, according to the distance value, the air output assembly to switch forms is performed. If the difference between the current ambient temperature and the preset temperature is smaller than or equal to the preset difference, it indicates that the current ambient temperature is relatively comfortable, and then the air output assembly is controlled to maintain the first form to ensure windless feeling to the greatest extent.

In any of the above embodiments, the air output assembly is in the first form, the air diffusing assembly shields the air outlet, the second air deflector rotates to abut against the air diffusing assembly, the first air deflector directs the air blown out of the air outlet to the air diffusing assembly, and the second blade is in the first operative position; the air output assembly is in the second form, the air diffusing assembly shields the air outlet, the second air deflector rotates to abut against the air diffusing assembly, the first air deflector directs the air blown out of the air outlet to the air diffusing assembly, and the second blade is in the second operative position; the air output assembly is in the third form, the air diffusing assembly shields the air outlet, the second air deflector rotates to abut against the air diffusing assembly, the first air deflector directs the air blown out of the air outlet to the second air deflector, and the second blade is in the first operative position.

In this embodiment, the first form is a default windless feeling form, the second form is a windless feeling front-side distribution state, and the third form is a windless feeling lower-side distribution state. The default windless feeling form is whole room windless feeling. The windless feeling front-side distribution is to ensure windless feeling at the location relatively close to the air conditioner, while increasing the air out put to the location relatively far away from the air conditioner. The windless feeling lower-side distribution state is to ensure windless feeling at the location relatively far away from the air conditioner, while increasing the air output to the location relatively close to the air conditioner.

In any of the above embodiments, the second air deflector and the air diffusing assembly are assembled to define a cavity in the shape of an angle located on the outer side of the air outlet of the air conditioner and communicated with the air outlet of the air conditioner, the cavity is formed with a side opening at both ends in a length direction of an assembly line between the second air deflector and the air diffusing assembly, and the side openings are communicated with the cavity.

In this embodiment, after the second air deflector is assembled with the air diffusing assembly, a cavity located on the outer side of the air outlet is formed, and the cavity is formed with a side opening on both sides, thus realizing air supply on both sides. In some implementations, a side fan may also be provided at the side opening to ensure the volume of air output from the side.

In any of the above embodiments, the detection device includes at least one of: a temperature sensor, an infrared distance detection device, an image recognition apparatus, and a radar position detection apparatus.

In this embodiment, the detection device is capable of detecting the distance of a target object, and the ambient temperature. For example, the detection device comprises a temperature sensor capable of detecting the ambient temperature. At the time of detecting the distance of the target object, it is feasible to detect a distance value by an infrared distance detection device, or photograph image information in front of the air conditioner, and determine the location of the target object by an image recognition apparatus, and further determine the distance value. And it is also feasible to realize the detection of the distance of the target object by a radar position detection apparatus.

The second aspect of the present disclosure provides a method for controlling an air conditioner, which is used for controlling the air conditioner provided in any of the above embodiments, the method comprising: acquiring a distance value of a target object from an air conditioner; and controlling, according to the distance value, the air output assembly of the air conditioner to switch forms.

In this embodiment, the air conditioner comprises an air output assembly, and the air output assembly has a plurality of forms and is capable of changing the air supply mode by switching forms.

For example, the distance value of the target object from the air conditioner is detected. The target object may be a human body, and may also be a preset object, such as "a bed", "a desk", "a sofa" and other furniture where the human body may stay. The air output assembly is controlled to switch forms according to the distance of the target object from the air conditioner, allowing the region where the "target object" is located to be in a windless feeling state, thus ensuring that air will not "blow directly" on a person's body, improving the comfort of the air conditioner. Meanwhile, in a region outside the region where the target object is located, the volume of air blowing can be increased by means of "direct blowing" or other modes, thereby improving cooling or heating efficiency under the condition of guaranteeing the person's need to not feel the air blowing, and thereby satisfying multiple requirements of the user.

In the above embodiment, the air output assembly includes a first form, and the control method further comprises: receiving a control instruction, and controlling, according to the control instruction, the air output assembly to work in the first form.

In this embodiment, the first form is a default windless feeling form. After being turned on, the air conditioner runs in an ordinary cooling mode or an ordinary heating mode by default, and the windless feeling mode is not activated at this time. When the air conditioner receives a corresponding control instruction, which is a windless feeling control instruction, through the communication interface, the air conditioner enters the default windless feeling state, and the room as a whole is in the windless feeling state at this time, ensuring, to the greatest extent, that the human body will not be "blown directly" by the cold air of the air conditioner.

In the above embodiment, the air output assembly includes a second form and a third form, and the step of controlling, according to the distance value, the air output assembly of the air conditioner to switch forms can comprise: acquiring a first preset distance range and a second preset distance range; determining that the distance value is within the first preset distance range and controlling the air output assembly to switch to the second form; and determining that the distance value is within the second preset distance range and controlling the air output assembly to switch to the third form.

In this embodiment, the second form is a windless feeling front-side distribution state, and the corresponding first preset distance is a range of distance relatively close to the air conditioner. In the second form, the air conditioner supplies air to the range of the first preset distance in the windless feeling mode, and at the same time supplies air to the range of the second preset distance in a relatively large air volume.

The third form is a windless feeling lower-side distribution state, and the corresponding second preset distance is a range of distance relatively far from the air conditioner. In the third form, the air conditioner supplies air to the range of the second preset distance in the windless feeling mode, and at the same time supplies air to the range of the first preset distance in a relatively large air volume.

By controlling the air output assembly to switch between different air supply states according to the distance of the target object, it is possible to effectively improve the cooling or heating efficiency and thus enhance the use experience of the air conditioner, while ensuring that the human body "does not feel the air blowing".

In the above embodiment, before the step of controlling, according to the distance value, the air output assembly of the air conditioner to switch forms, the control method further comprises: acquiring an ambient temperature, and acquiring a preset difference and a preset temperature; calculating a first difference between the ambient temperature and the preset temperature; and when determining that the first difference is greater than the preset difference, performing the step of controlling, according to the distance value, the air output assembly to switch forms.

In this embodiment, when the first difference between the ambient temperature and the preset temperature is greater than the preset difference, it indicates that there is a relatively large temperature difference between the current ambient temperature and the comfortable temperature. In order to improve the cooling or heating effect, the step of controlling, according to the distance value, the air output assembly to switch forms is performed. If the first difference between the current ambient temperature and the preset temperature is smaller than or equal to the preset difference, it indicates that the current ambient temperature is relatively comfortable, and then the air output assembly is controlled to maintain the first form to ensure windless feeling to the greatest extent.

In any of the above embodiments, the step of acquiring an ambient temperature can comprise: acquiring a corresponding first ambient temperature in a first preset distance range and acquiring a corresponding second ambient temperature in a second preset distance range; and the control method further comprises: calculating a second difference between the first ambient temperature and the second ambient temperature; determining that the second difference is positive and the second difference is greater than the preset difference, controlling the air output assembly to switch to the third form; and determining that the second difference is negative and an absolute value of the second difference is greater than the preset difference, controlling the air output assembly to switch to the second form.

In this embodiment, when there is a temperature difference between the first ambient temperature in the first preset distance range and the second ambient temperature in the second preset distance range, it indicates that the temperature in the room is currently not uniform. If the second difference is positive and the second difference is greater than the preset difference, it indicates that the temperature within the first preset distance is relatively high, then the air output assembly is controlled to switch to the third state to reduce the temperature within the first preset distance range.

If the second difference is negative and the absolute value of the second difference is greater than the preset difference, it indicates that the temperature within the second preset distance is relatively high, then the air output assembly is controlled to switch to the second state to reduce the temperature within the first preset distance, so as to improve the user experience.

In any of the above embodiments, the step of controlling, according to the distance value, the air output assembly of the air conditioner to switch between the first form, the second form and the third form further comprises: determining a change trend of the distance value according to a plurality of distance values acquired within a preset duration; determining that the change trend is a descending trend, and controlling the air output assembly to switch from the third form to the first form and then from the first form to the second from; and determining that the change trend is an ascending trend, and controlling the air output assembly to switch from the second form to the first form and then from the first form to the third form.

In this embodiment, the moving direction of the target object, such as a human body, can be determined according to the change trend of the plurality of distance values within the preset duration. If the change trend is a descending trend, it indicates that the human body moves towards the air conditioner, and in such a case, the air output assembly is controlled to switch from the third form to the first form and then from the first form to the second form. If the change trend is an ascending trend, it indicates that the human body moves away from the air conditioner, and in such a case, the air output assembly is controlled to switch from the second form to the first form and then from the first form to the third form, to avoid the output air blowing directly on the human body.

In any of the above embodiments, the preset temperature is greater than or equal to 25° C. and less than or equal to 27° C.; and the preset difference is greater than or equal to 1.5° C. and less than or equal to 3.5° C.

In this embodiment, the preset temperature is the human body comfort temperature. It may be understood that the preset temperature can be correspondingly raised when there are people who are physically weaker, such as the elderly and children. Therefore, the preset temperature and the preset difference can be set freely according to the actual needs of the user, and are not limited to the above-mentioned ranges.

In any of the above embodiments, the method for controlling an air conditioner further comprises: determining that the ambient temperature is within the range of the preset temperature, and controlling the air output assembly to switch from the second form or the third form to the first form.

In this embodiment, when the ambient temperature is within the range of the preset temperature, it indicates that the cooling or heating effect has been achieved currently, and the air output assembly is controlled to switch to the first form to ensure "windless feeling" to the largest extent to improve the user experience.

In any of the above embodiments, the method for controlling an air conditioner further comprises: recording duration information of the air output assembly in the first form, the second form and the third form, respectively, and generating a historical form record according to the duration information; determining that a power-on instruction is received, and selecting one of the first form, the second form and the third form as an initial form according to the historical form record; and controlling the air output assembly to start working in the initial form.

In this embodiment, the air conditioner generates a historical form record according to the duration information corresponding to the form in which the air output assembly is, and the most frequently used form of the user can be acquired according to the historical form record. When the user turns on the air conditioner again, the form with the longest use time by the user is taken as the initial form by default, and the air output assembly is controlled to work in the initial form, which can ensure, to the largest extent, that the air output mode of the air conditioner matches the user's usage habits, thus improving the use experience of the user.

The third aspect of the present disclosure provides a computer-readable storage medium on which a computer program is stored, when the computer program is executed by a processor, the method for controlling an air conditioner as provided in any of the above embodiments is implemented. Therefore, the computer-readable storage medium includes all the beneficial effects of the method for controlling an air conditioner as provided in any of the above embodiments, which will not be repeated here.

BRIEF DESCRIPTION OF THE DRAWINGS

The above and/or additional aspects and advantages of the present disclosure will become apparent and readily understood from the following description of embodiments in conjunction with the drawings, wherein.

Figure 1:
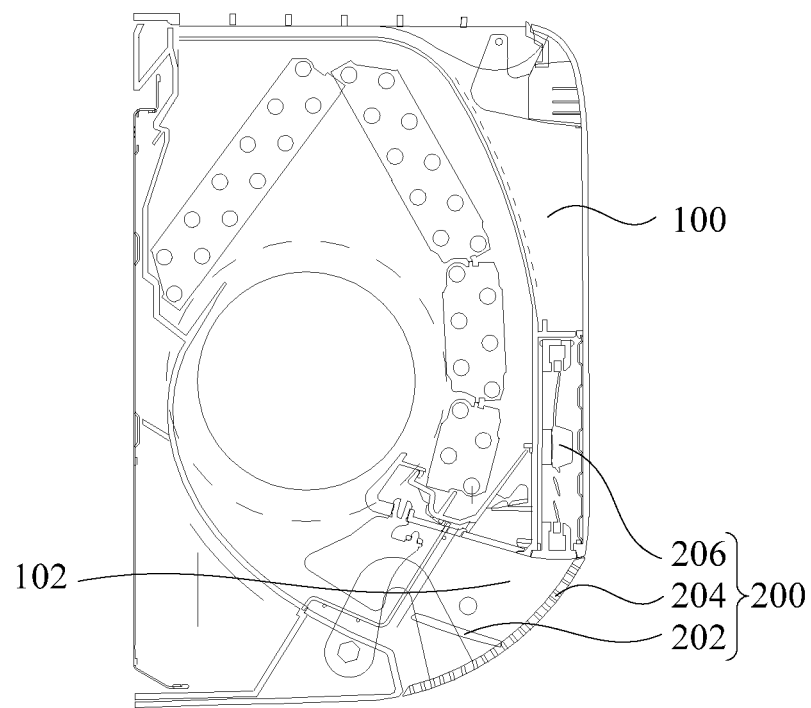
FIG. 1 is a schematic structural diagram of an air conditioner according to an embodiment of the present disclosure.

The corresponding relationship between the reference signs and component names in FIGS. 1 to 13 is as follows:

air conditioner body 100, air outlet 102, air output assembly 200, first air deflector 202, second air deflector 204, air diffusing assembly 206, wind wheel 300, inner rib 302, outer ring rib 304, first blade 306, second blade 308, convex rib 310, positioning portion 312, detection device 400, controller 500, and communication interface 600.

DETAILED DESCRIPTION OF THE INVENTION

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

The air conditioner, the method for controlling an air conditioner, and the computer-readable storage medium according to some embodiments of the present disclosure are described below with reference to FIG. 1 to FIG. 13.

Figure 2:
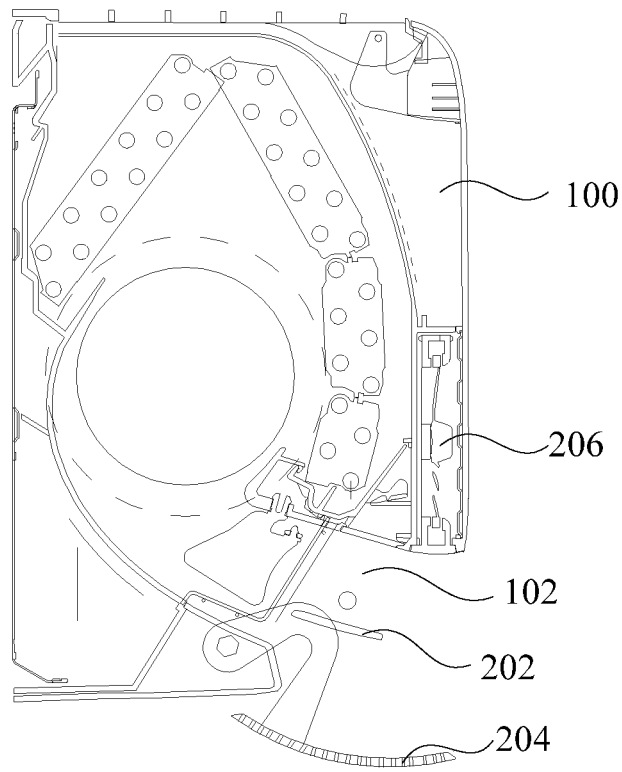
FIG. 2 is another schematic structural diagram of the air conditioner.
Figure 13:
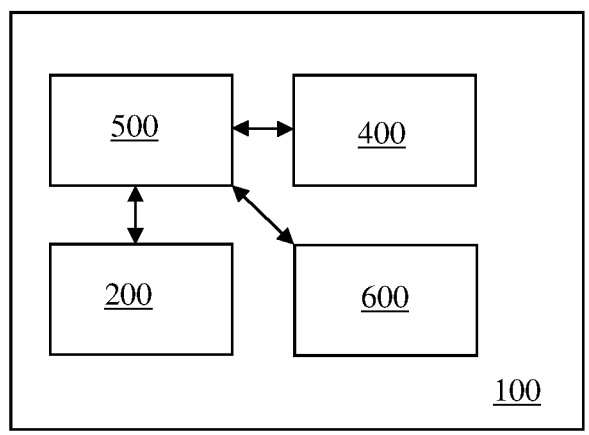
FIG. 13 is a schematic block diagram of the air conditioner.

As shown in FIG. 1, FIG. 2 and FIG. 13, in an embodiment of the present disclosure, an air conditioner is provided, comprising: an air conditioner body 100, the air conditioner body 100 being provided with an air outlet 102; an air output assembly 200 configured to adjust air output of the air outlet 102, the air output assembly 200 having a plurality of operative configurations; a detection device 400 configured to be suitable for acquiring a distance value of a target object from the air conditioner; and a controller 500, the controller being electrically connected to the air output assembly 200 and the detection device and controlling, according to the distance value, the air output assembly 200 to switch among the plurality of operative configurations.

The detection device includes at least one of: a temperature sensor, an infrared distance detection device, an image recognition apparatus, and a radar position detection apparatus.

In this embodiment, the air conditioner comprises an air conditioner body 100 provided with an air outlet 102, and through the air outlet 102, the air after heat exchange with an indoor heat exchanger is blown out to achieve cooling or heating. An air output assembly 200 is provided at the air outlet 102, and the air output assembly 200 has a plurality of operative configurations and can change the air supply mode by switching the air output assembly 200 among the plurality of operative configurations.

When the air conditioner is turned off, the operative configuration of the air output assembly 200 is as shown in FIG. 1. When the air conditioner is turned on and running in the cooling mode, and the windless feeling mode is not activated, the operative configuration of the air output assembly 200 is as shown in FIG. 2.

For example, the air conditioner is provided with a detection device which can measure a distance value of a target object from the air conditioner. The target object may be a human body, and may also be a preset object, such as "a bed", "a desk", "a sofa" and other furniture where the human body may stay. The air output assembly 200 is controlled to switch operative configurations according to the distance of the target object from the air conditioner, allowing the region where the "target object" is located to be in a windless feeling state, thus ensuring that air will not "blow directly" on a person's body, improving the comfort of the air conditioner. Meanwhile, in a region outside the region where the target object is located, the volume of air blowing can be increased by means of "direct blowing" or other modes, thereby improving cooling or heating efficiency under the condition of guaranteeing the person's need to not feel the air blowing, and thereby satisfying multiple requirements of the user.

The definition of "windless feeling" is as follows: in the range of 2.5 meters to 3 meters from the air outlet of the air conditioner, the velocity of airflow is below 0.1 m/s on average, or at a distance of 2.5 meters or less from the air outlet, the DR (air delivery rate) value ranges from 5 to 20.

The detection device is capable of detecting the distance of a target object, and the ambient temperature. For example, the detection device comprises a temperature sensor capable of detecting the ambient temperature. At the time of detecting the distance of the target object, it is feasible to detect a distance value by an infrared distance detection device, or photograph image information in front of the air conditioner, and determine the location of the target object by an image recognition apparatus, and further determine the distance value. And it is also feasible to realize the detection of the distance of the target object by a radar position detection apparatus.

Figure 3:
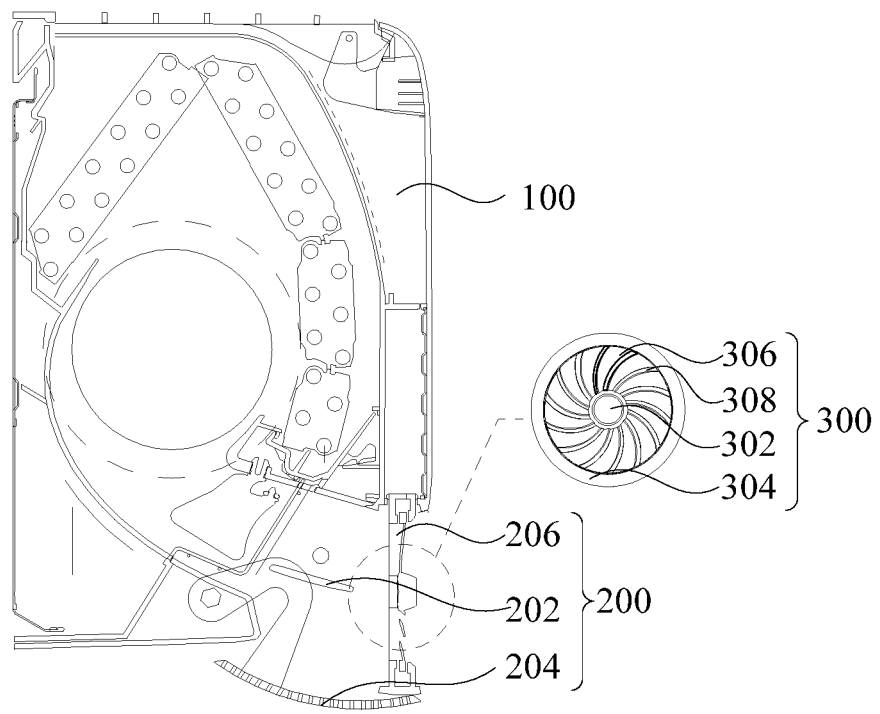
FIG. 3 is a further schematic structural diagram of the air conditioner.
Figure 4:
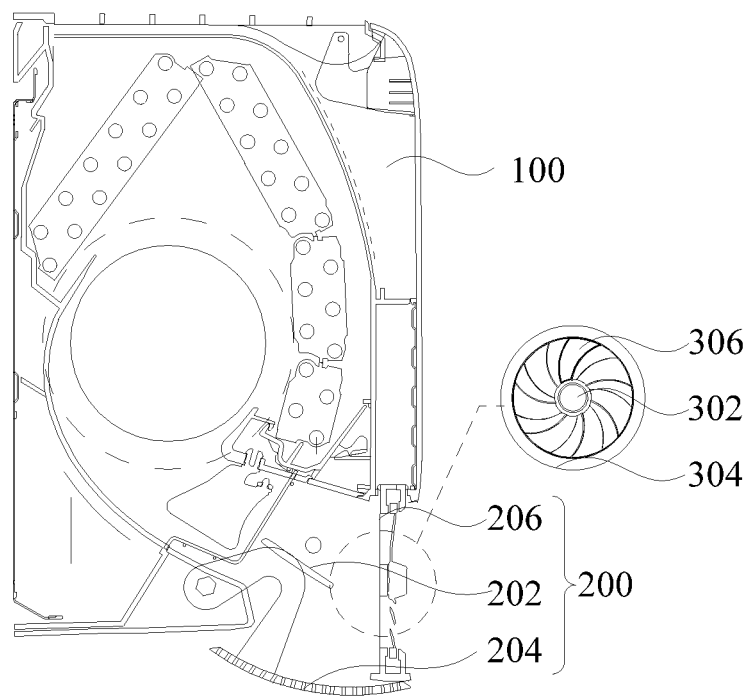
FIG. 4 is a still further schematic structural diagram of the air conditioner.
Figure 5:
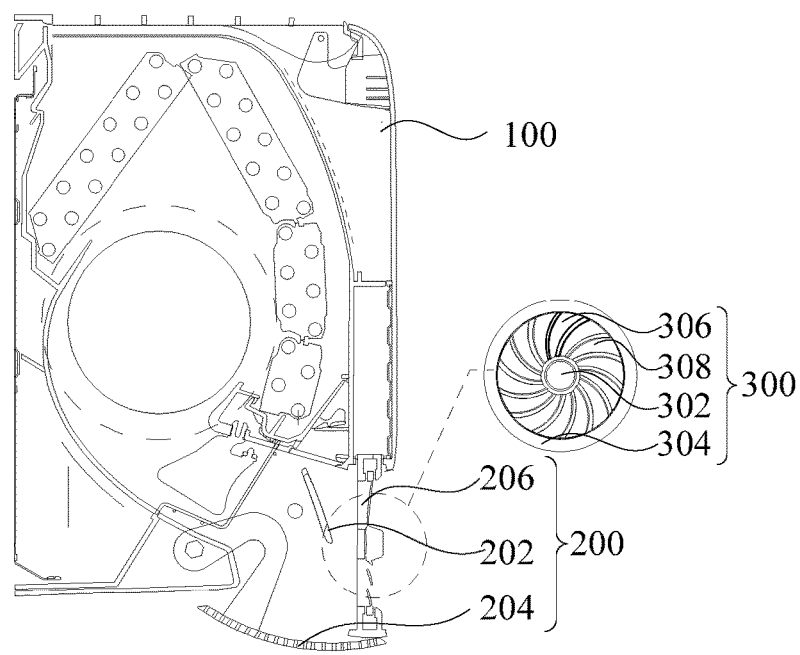
FIG. 5 is a still further schematic structural diagram of the air conditioner.

As shown in FIG. 3, FIG. 4 and FIG. 5, in an embodiment of the present disclosure, the air output assembly 200 of the air conditioner has a plurality of operative configurations.

As shown in FIG. 3, the plurality of operative configurations include a first operative configuration, and the air conditioner further comprises: a communication interface 600 (shown in FIG. 13) electrically connected to the controller and configured to receive a control instruction; and the controller controls, according to the control instruction, the air output assembly 200 to work in the first operative configuration.

As shown in FIG. 4 and FIG. 5, the plurality of operative configurations further include a second operative configuration and a third operative configuration, and the controller controlling, according to the distance value, the air output assembly 200 to switch operative configurations can comprise: acquiring a first preset distance range and a second preset distance range; determining that the distance value is within the first preset distance range and controlling the air output assembly 200 to switch to the second operative configuration; and determining that the distance value is within the second preset distance range and controlling the air output assembly 200 to switch to the third operative configuration.

In this embodiment, the first operative configuration is a default windless feeling operative configuration. After being turned on, the air conditioner runs in an ordinary cooling mode or an ordinary heating mode by default, and the windless feeling mode is not activated at this time. When the air conditioner receives a corresponding control instruction, which is a windless feeling control instruction, through the communication interface, the air conditioner enters the default windless feeling state, and the room as a whole is in the windless feeling state at this time, ensuring, to the greatest extent, that the human body will not be "blown directly" by the cold air of the air conditioner.

FIG. 3 is a schematic diagram in which the air output assembly 200 is in the first operative configuration, FIG. 4 is a schematic diagram in which the air output assembly 200 is in the second operative configuration, and FIG. 5 is a schematic diagram in which the air output assembly is in the third operative configuration.

The second operative configuration is a windless feeling front-side distribution state, and the corresponding first preset distance is a range of distance relatively close to the air conditioner. In the second operative configuration, the air conditioner supplies air to the range of the first preset distance in the windless feeling mode, and at the same time supplies air to the range of the second preset distance in a relatively large air volume.

The third operative configuration is a windless feeling lower-side distribution state, and the corresponding second preset distance is a range of distance relatively far from the air conditioner. In the third operative configuration, the air conditioner supplies air to the range of the second preset distance in the windless feeling mode, and at the same time supplies air to the range of the first preset distance in a relatively large air volume.

By controlling the air output assembly to switch between different air supply states according to the distance of the target object, it is possible to effectively improve the cooling or heating efficiency and thus enhance the use experience of the air conditioner, while ensuring that the human body "does not feel the air blowing".

In some embodiments, the detection device is also suitable for acquiring an ambient temperature, before the controller controls, according to the distance value, the air output assembly 200 to switch operative configurations, the controller acquires a preset difference and a preset temperature, and calculates a first difference between the ambient temperature and the preset temperature; and when determining that the first difference is greater than the preset difference, the controller performs the step of controlling, according to the distance value, the air output assembly 200 to switch operative configurations.

When the first difference between the ambient temperature and the preset temperature is greater than the preset difference, it indicates that there is a relatively large temperature difference between the current ambient temperature and the comfortable temperature. In order to improve the cooling or heating effect, the step of controlling, according to the distance value, the air output assembly 200 to switch operative configurations is performed. If the difference between the current ambient temperature and the preset temperature is smaller than or equal to the preset difference, it indicates that the current ambient temperature is relatively comfortable, then the air output assembly 200 is controlled to maintain the first operative configuration to ensure windless feeling to the greatest extent.

As shown in FIG. 3, FIG. 4 and FIG. 5, in an embodiment of the present disclosure, the air output assembly 200 comprises: a first air deflector 202 provided in the air outlet 102, the first air deflector 202 is suitable for rotating relative to an orientation of the air outlet 102 to change an air output direction of the air outlet 102; a second air deflector 204 rotatably connected to the air conditioner body 100 and configured to open or close the air outlet 102, the second air deflector 204 being provided with through holes for airflow to pass through; and an air diffusing assembly 206 connected to the air conditioner body 100 and suitable for moving relative to the air conditioner body 100 to shield or open the air outlet 102, the air diffusing assembly 206 being formed with an air diffusing structure, and the air diffusing structure being suitable for allowing an air flow to pass through and diffusing the passing air flow.

Figure 6:
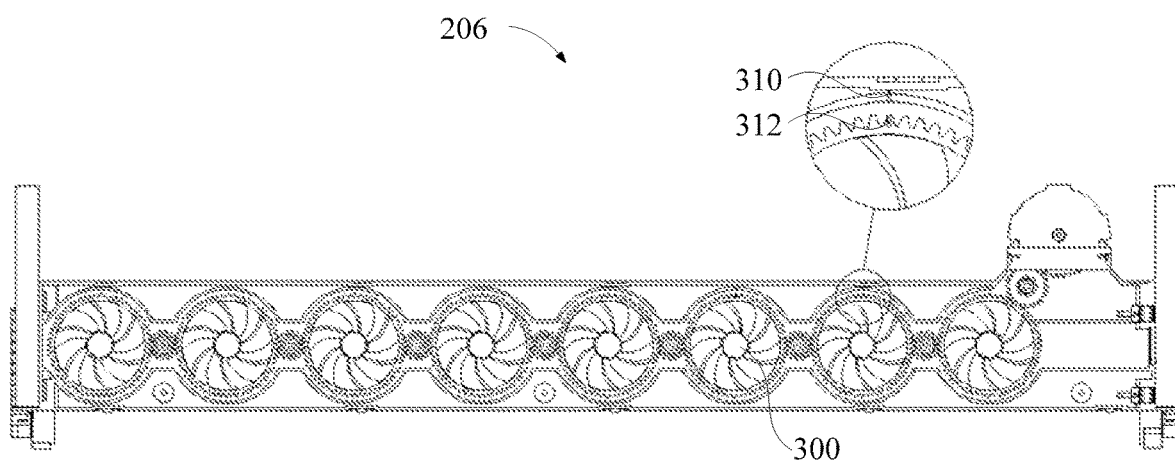
FIG. 6 is a schematic structural diagram of an air diffusing assembly of the air conditioner.

As shown in FIG. 6, the air diffusing structure comprises: a plurality of wind wheels 300, the plurality of wind wheels 300 being meshed and driven by a gear structure, the wind wheel 300 comprising an inner rib 302 and an outer ring rib 304, first blades 306 and second blades 308 being provided between the inner rib 302 and the outer ring rib 304, the first blades 306 being fixedly connected to the inner rib 302 and the outer ring rib 304, the second blades 308 being rotatably connected to the inner rib 302, and the second blades 308 having a first operative position and a second operative position. When the second blades 308 are in the first operative position, the second blades 308 and the first blades 306 are arranged at intervals; and when the second blades 308 are in the second operative position, at least part of the second blades 308 coincide with the first blades 306 in an axial direction of the wind wheel 300.

The outer ring rib 304 is provided with a positioning portion 312 protruding towards the inner rib 302, and the second blade 308 is provided with a convex rib 310 corresponding to the positioning portion 312, the second blade 308 moves to the first operative position, and the positioning portion 312 abuts against the convex rib 310 to limit the second blade 308.

In this embodiment, the air output assembly 200 comprises a first air deflector 202, a second air deflector 204 and an air diffusing assembly 206. The first air deflector 202 is disposed in the air outlet 102 and can rotate along an axis parallel to the air outlet 102, so as to change the air output direction of the air outlet 102 to achieve "long-distance" air supply or "short-distance" air supply. The second air deflector 204 is used for opening or closing the air outlet 102. When the air conditioner is turned off, the second air deflector 204 covers the air outlet 102; and when the air conditioner is turned on, the second air deflector 204 rotates relative to the air conditioner body 100 and opens the air outlet 102. Moreover, the second air deflector 204 is provided with a plurality of through holes, and after passing through the through holes, the airflow is broken up into a plurality of small staggered airflows.

The air diffusing assembly 206 can move relative to the air conditioner body 100. When the windless feeling mode is not activated, the air diffusing assembly 206 is received in the air conditioner body 100. After the windless feeling mode is activated, the air diffusing assembly 206 extends out to abut against one end of the second air deflector 204 and shield the air outlet 102. The air diffusing assembly 206 is further provided with an air diffusing structure. Through the air diffusing structure, the airflow passing through the air diffusing assembly 206 can be broken up and dispersed to achieve "windless feeling" and "direct blowing prevention".

The air diffusing structure comprises a plurality of wind wheels 300, and the plurality of wind wheels 300 are meshed and driven by a gear structure and rotate under the driving of a motor to disperse the airflow passing therethrough. The wind wheel 300 comprises an inner rib 302 and an outer ring rib 304, and first blades 306 and second blades 308 are provided between the inner rib 302 and the outer ring rib 304. The first blades 306 are static blades, which are fixedly connected to the outer ring rib 304 and the inner rib 302. The second blades 308 are dynamic blades, and can rotate with the inner rib 302 as a rotation shaft and switch between the first operative position and the second operative position.

When the second blades 308 rotate to the first operative position, the second blades 308 and the first blades 306 are arranged at intervals, and the blades of the wind wheel 300 are distributed "relatively densely" at this time, so the velocity of the airflow through the wind wheel 300 is relatively low, leading to a relatively strong "windless feeling" effect. When the second blades 308 rotate to the second operative position, at least part of the second blades 308 coincide with the first blades 306, and the blades of the wind wheel 300 are distributed "relatively thinly" at this time, so the velocity of the airflow through the wind wheel 300 is relatively high, leading to a relatively weak "windless feeling" effect and a relatively strong air supply capability.

The outer ring rib is provided with a protruding positioning portion 312, and the second blade 308 is provided with a convex rib 310 cooperating with the positioning portion 312, and when the second blade 308 is controlled to move for position switching, the position of the second blade 308 is limited by the convex rib 310 and the positioning portion 312 to realize positioning. When the air conditioner is turned off and reset, or when the second blade 308 is switched to the first operative position, the second blade 308 is driven to rotate by a motor until the convex rib 310 abuts against the positioning portion 312, and the motor locks the second blade 308.

The motor driving the second blade 308 can be a stepper motor, and the position of the second blade 308 is adjusted by controlling the stepper motor to rotate by a fixed number of steps.

As shown in FIG. 3, FIG. 4 and FIG. 5, in an embodiment of the present disclosure, the controller controlling, according to a control instruction, the air output assembly 200 to work in the first operative configuration can comprise: the controller controlling the air diffusing assembly 206 to shield the air outlet 102, controlling the second blade 308 to move to the first operative position, and controlling the first air deflector 202 to rotate to a first angle.

The controller controlling the air output assembly 200 to switch to the second operative configuration can comprise: controlling the second blade 308 to move to the second operative position, and controlling the first air deflector 202 to rotate from the first angle to a second angle.

The controller controlling the air output assembly 200 to switch to the third operative configuration can comprise: controlling the first air deflector 202 to rotate from the first angle to a third angle. The first air deflector 202 rotates to the first angle or the second angle, the first air deflector 202 directs the air blown out of the air outlet 102 to the air diffusing assembly 206; and the first air deflector 202 rotates to the third angle, the first air deflector 202 directs the air blown out of the air outlet 102 to the second air deflector 204.

The air output assembly is in the first operative configuration, the air diffusing assembly 206 shields the air outlet 102, the second air deflector 204 rotates to abut against the air diffusing assembly 206, the first air deflector 202 directs the air blown out of the air outlet 102 to the air diffusing assembly 206, and the second blade 308 is in the first operative position; the air output assembly is in the second operative configuration, the air diffusing assembly 206 shields the air outlet 102, the second air deflector 204 rotates to abut against the air diffusing assembly 206, the first air deflector 202 directs the air blown out of the air outlet 102 to the air diffusing assembly 206, and the second blade 308 is in the second operative position; the air output assembly is in the third operative configuration, the air diffusing assembly 206 shields the air outlet 102, the second air deflector 204 rotates to abut against the air diffusing assembly 206, the first air deflector 202 directs the air blown out of the air outlet 102 to the second air deflector 204, and the second blade 308 is in the first operative position.

The second air deflector 204 and the air diffusing assembly 206 are assembled to define a cavity in the shape of an angle located on the outer side of the air outlet 102 of the air conditioner and communicated with the air outlet 102 of the air conditioner, the cavity is formed with a side opening at both ends in a length direction of an assembly line between the second air deflector 204 and the air diffusing assembly 206, and the side openings are communicated with the cavity.

In this embodiment, when controlling the air output assembly 200 to switch to the first operative configuration, the controller first controls the air diffusing assembly 206 to shield the air outlet 102 to enter the windless feeling mode. After rotating to the first angle, the first air deflector 202 directs the air output of the air outlet 102 mainly to the structure of the air diffusing assembly 206, and at the same time the second blade 308 of the air diffusing assembly 206 is controlled to move to the first operative position, leading to the strongest windless feeling effect. The first air deflector 202 is controlled to rotate to the first angle.

When the air output assembly 200 is controlled to switch to the second operative configuration, the position of the air diffusing assembly 206 is maintained, and the first air deflector 202 is controlled to rotate from the first angle to the second angle, at this time, the first air deflector 202 still maintains directing the air output of the air outlet 102 to the air diffusing assembly 206, but after the first air deflector 202 is adjusted to the second angle, the coverage of the air output direction is the range corresponding to the first preset distance. At the same time, the second blade 308 is controlled to move to the second operative position to increase the volume of air supplied to the range of the first preset distance to improve the cooling or heating effect.

When the air output assembly 200 is controlled to switch to the third operative configuration, the first air deflector 202 is controlled to rotate from the first angle to the third angle, and after the first air deflector 202 rotates to the third angle, the first air deflector 202 directs the air output of the air outlet 102 to the first air deflector 202, i.e., air comes out through the through holes provided in the first air deflector 202. At the same time, the air diffusing assembly 206 maintains the strongest windless feeling effect, to ensure that the human body within the range corresponding to the first preset distance will not be "blown directly", while increasing the volume of air supplied to the range of the second preset distance, in order to improve the cooling or heating effect.

The first operative configuration is a default windless feeling form, the second operative configuration is a windless feeling front-side distribution state, and the third operative configuration is a windless feeling lower-side distribution state. The default windless feeling form is whole room windless feeling. The windless feeling front-side distribution is to ensure windless feeling at the location relatively close to the air conditioner, while increasing the air output to the location relatively far away from the air conditioner. The windless feeling lower-side distribution state is to ensure windless feeling at the location relatively far away from the air conditioner, while increasing the air output to the location relatively close to the air conditioner.

After the second air deflector 204 is assembled with the air diffusing assembly 206, a cavity located on the outer side of the air outlet 102 is formed, and the cavity is formed with a side opening on both sides, thus realizing air supply on both sides. In some implementations, a side fan may also be provided at the side opening to ensure the volume of air output from the side.

In an embodiment of the present disclosure, the user turns on the machine and selects the cooling mode operation, and the air output assembly operates at a cooling angle. When receiving a windless feeling function signal, the air output assembly swings from the cooling angle to a windless feeling default angle, and at this time the wind wheels are positioned to be staggered.

The difference between room temperature and comfort temperature is detected. If the difference is less than the preset temperature, it is determined that the room requires for maintaining the cooling capacity, and at this time, the air guide plate is at the windless feeling default angle. If the difference is greater than the preset temperature, it is determined that the room needs to be cooled, and the following control is performed.

Control is performed according to the user's position. The user position information is acquired by an intelligent device, if the user's distance from the air conditioner is within the first preset distance range, the air guide plate component swings from the windless feeling default angle to the windless feeling front-side distribution angle, and at this time, cyclonic blades are positioned to be staggered.

If the user's distance from the air conditioner is within the second preset distance range, the air guide plate component swings from the windless feeling default angle to the windless feeling lower-side distribution angle.

If the user is getting close to the air conditioner, the air guide plate component transitions from the windless feeling lower-side distribution angle to the windless feeling default angle, and then swings to the windless feeling front-side distribution angle.

Control is performed according to the position of a preset object. Taking the case as an example where the preset object is a bed, information of the position relationship between the air conditioner and the bed when the air conditioner is installed is acquired, if the distance of the bed from the air conditioner is within the first preset distance range, the air guide plate component swings from the windless feeling default angle to the windless feeling front-side distribution angle, at this time, the cyclonic blades are positioned to be staggered; and if the distance of the bed from the air conditioner is within the second preset distance range, the air guide plate component swings from the windless feeling default angle to the windless feeling lower-side distribution angle.

In some implementations, due to the overall decrease in heat exchange capability of the system in the windless feeling mode, the cold is concentrated on the indoor heat exchanger and cannot be fully discharged; then it is feasible to control the air conditioner to increase the downward (the ground-facing direction) air output to improve the efficiency of cold discharge by using the downward flow trend of the cold, thereby improving the performance of the system.

In some cases, due to the positive pressure at the air outlet and the negative pressure at the air return port that may occur in the windless feeling mode, a circulation may be formed in the vicinity of the air conditioner. As a result, the overall air volume is reduced, the overall circulation of the room becomes poor, and the user feels "stuffy".

In order to solve the above problem, differential air supply may be employed. Such a mode is employed that air supply is implemented partially with a large volume and partially with a small volume, to promote the exchange of airflow in the different places in the room.

Figure 7:
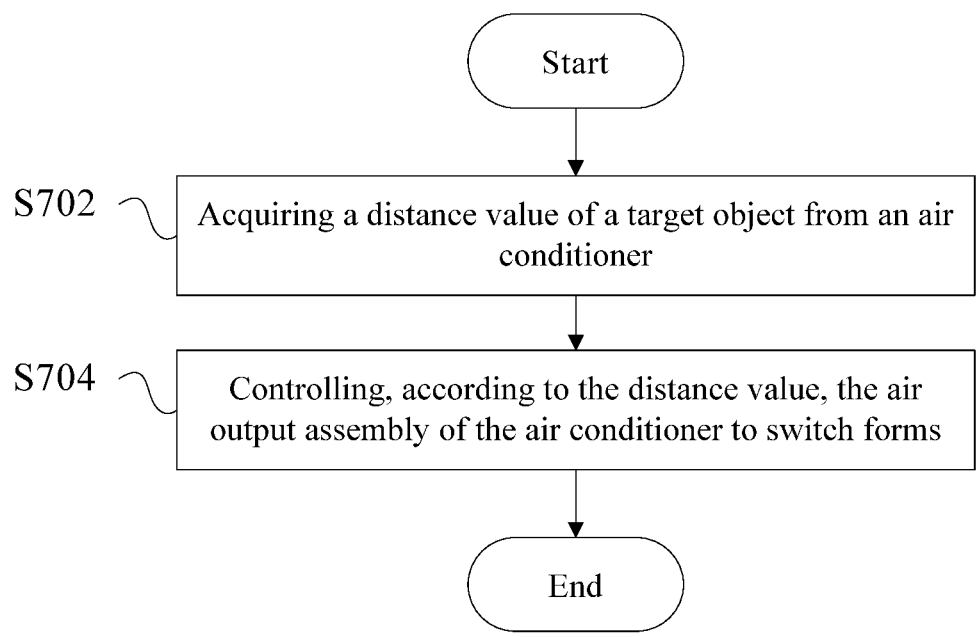
FIG. 7 is a flowchart of a method for controlling an air conditioner according to an embodiment of the present disclosure.

As shown in FIG. 7, in an embodiment of the present disclosure, a method for controlling an air conditioner is provided, which is used for controlling the air conditioner provided in any of the above embodiments, the method comprising:

step S702, acquiring a distance value of a target object from an air conditioner; and step S704, controlling, according to the distance value, the air output assembly of the air conditioner to switch among the plurality of operative configurations.

In this embodiment, the air conditioner comprises an air output assembly, and the air output assembly has a plurality of operative configurations and is capable of changing the air supply mode by switching operative configurations.

For example, the distance value of the target object from the air conditioner is detected. The target object may be a human body, and may also be a preset object, such as "a bed", "a desk", "a sofa" and other furniture where the human body may stay. The air output assembly is controlled to switch operative configurations according to the distance of the target object from the air conditioner, allowing the region where the "target object" is located to be in a windless feeling state, thus ensuring that air will not "blow directly" on a person's body, improving the comfort of the air conditioner. Meanwhile, in a region outside the region where the target object is located, the volume of air blowing can be increased by means of "direct blowing" or other modes, thereby improving cooling or heating efficiency under the condition of guaranteeing the person's need to not feel the air blowing, and thereby satisfying multiple requirements of the user.

The air output assembly includes a first operative configuration, and the control method further comprises: receiving a control instruction, and controlling, according to the control instruction, the air output assembly to work in the first operative configuration.

The first operative configuration is a default windless feeling form. After being turned on, the air conditioner runs in an ordinary cooling mode or an ordinary heating mode by default, and the windless feeling mode is not activated at this time. When the air conditioner receives a corresponding control instruction, which is a windless feeling control instruction, through the communication interface, the air conditioner enters the default windless feeling state, and the room as a whole is in the windless feeling state at this time, ensuring, to the greatest extent, that the human body will not be "blown directly" by the cold air of the air conditioner.

Figure 8:
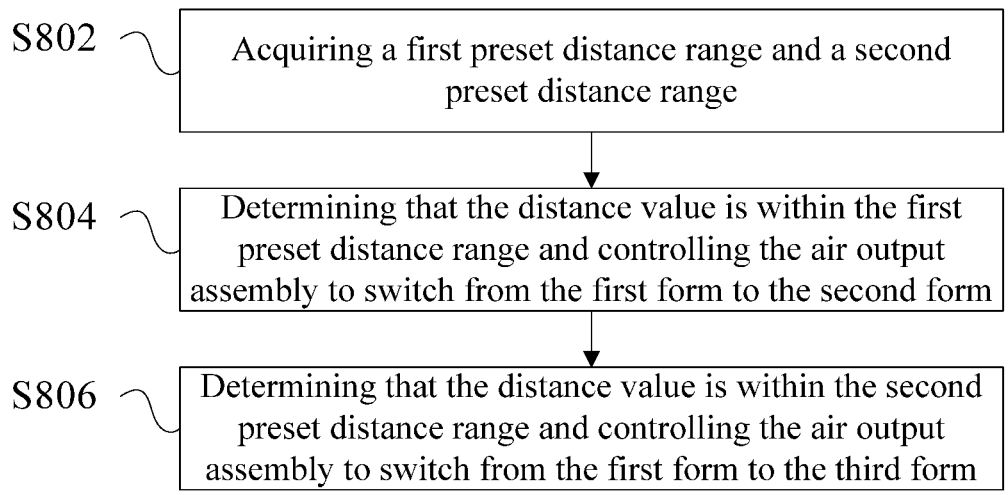
FIG. 8 is another flowchart of the method.

The air output assembly further includes a second operative configuration and a third operative configuration, as shown in FIG. 8, the step of controlling, according to the distance value, the air output assembly of the air conditioner to switch operative configurations can comprise:

step S802, acquiring a first preset distance range and a second preset distance range;

step S804, determining that the distance value is within the first preset distance range and controlling the air output assembly to switch to the second operative configuration; and step S806, determining that the distance value is within the second preset distance range and controlling the air output assembly to switch to the third operative configuration.

The second operative configuration is a windless feeling front-side distribution state, and the corresponding first preset distance is a range of distance relatively close to the air conditioner. In the second operative configuration, the air conditioner supplies air to the range of the first preset distance in the windless feeling mode, and at the same time supplies air to the range of the second preset distance in a relatively large air volume.

The third operative configuration is a windless feeling lower-side distribution state, and the corresponding second preset distance is a range of distance relatively far from the air conditioner. In the third operative configuration, the air conditioner supplies air to the range of the second preset distance in the windless feeling mode, and at the same time supplies air to the range of the first preset distance in a relatively large air volume.

By controlling the air output assembly to switch between different air supply states according to the distance of the target object, it is possible to effectively improve the cooling or heating efficiency and thus enhance the use experience of the air conditioner, while ensuring that the human body "does not feel the air blowing".

Figure 9:
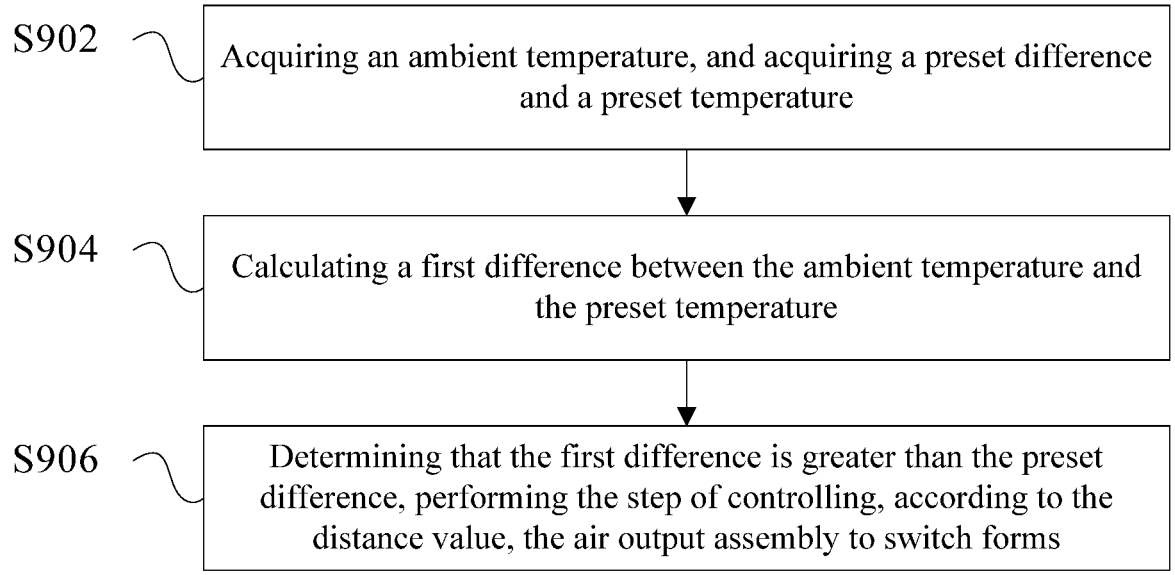
FIG. 9 is a further flowchart of the method.

As shown in FIG. 9, in an embodiment of the present disclosure, before the step of controlling, according to the distance value, the air output assembly of the air conditioner to switch operative configurations, the control method further comprises:

step S902, acquiring an ambient temperature, and acquiring a preset difference and a preset temperature;

step S904, calculating a first difference between the ambient temperature and the preset temperature; and step S906, when determining that the first difference is greater than the preset difference, performing the step of controlling, according to the distance value, the air output assembly to switch operative configurations.

When the difference between the ambient temperature and the preset temperature is greater than the preset difference, it indicates that there is a relatively large temperature difference between the current ambient temperature and the comfortable temperature. In order to improve the cooling or heating effect, the step of controlling, according to the distance value, the air output assembly to switch forms is performed. If the difference between the current ambient temperature and the preset temperature is smaller than or equal to the preset difference, it indicates that the current ambient temperature is relatively comfortable, and then the air output assembly is controlled to maintain the first operative configuration to ensure windless feeling to the greatest extent.

In some implementations, the step of acquiring an ambient temperature can comprise: acquiring a corresponding first ambient temperature in a first preset distance range and acquiring a corresponding second ambient temperature in a second preset distance range; and the control method further comprises: calculating a second difference between the first ambient temperature and the second ambient temperature; determining that the second difference is positive and the second difference is greater than the preset difference, controlling the air output assembly to switch to the third operative configuration; and determining that the second difference is negative and an absolute value of the second difference is greater than the preset difference, controlling the air output assembly to switch to the second operative configuration.

In this embodiment, when there is a temperature difference between the first ambient temperature in the first preset distance range and the second ambient temperature in the second preset distance range, it indicates that the temperature in the room is currently not uniform. If the second difference is positive and the second difference is greater than the preset difference, it indicates that the temperature within the first preset distance is relatively high, then the air output assembly is controlled to switch to the third state to reduce the temperature within the first preset distance range.

If the second difference is negative and the absolute value of the second difference is greater than the preset difference, it indicates that the temperature within the second preset distance is relatively high, then the air output assembly is controlled to switch to the second state to reduce the temperature within the first preset distance, so as to improve the user experience.

The preset temperature is greater than or equal to 25° C. and less than or equal to 27° C.; and the preset difference is greater than or equal to 1.5° C. and less than or equal to 3.5° C.

The preset temperature is the human body comfort temperature. It may be understood that the preset temperature can be correspondingly raised when there are people who are physically weaker, such as the elderly and children. Therefore, the preset temperature and the preset difference can be set freely according to the actual needs of the user, and are not limited to the above-mentioned ranges.

Figure 10:
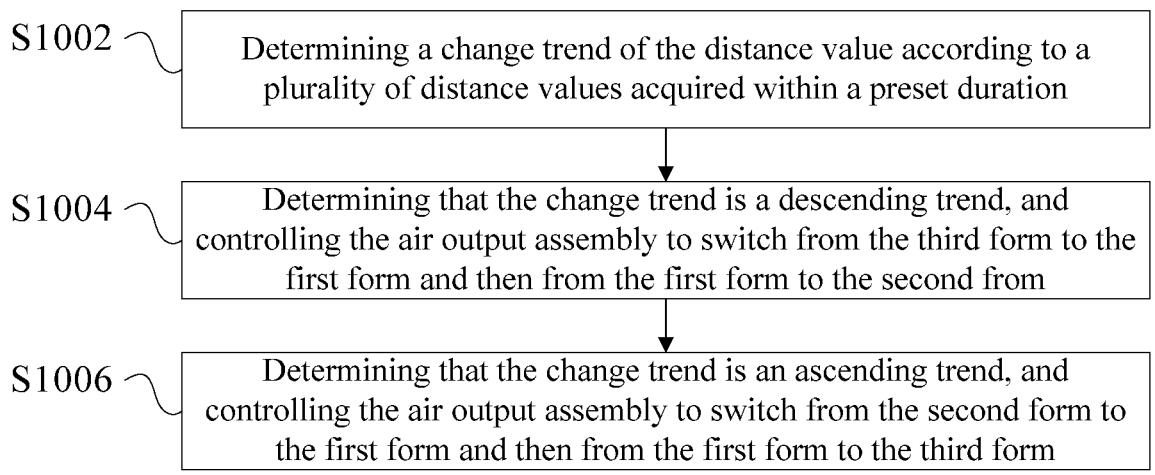
FIG. 10 is a still further flowchart of the method.

In an embodiment of the present disclosure, as shown in FIG. 10, the step of controlling, according to the distance value, the air output assembly of the air conditioner to switch between the first operative configuration, the second operative configuration and the third operative configuration further comprises:

- step S1002, determining a change trend of the distance value according to a plurality of distance values acquired within a preset duration;
- step S1004, determining that the change trend is a descending trend, and controlling the air output assembly to switch from the third operative configuration to the first operative configuration and then from the first operative configuration to the second operative configuration; and
- step S1006, determining that the change trend is an ascending trend, and controlling the air output assembly to switch from the second operative configuration to the first operative configuration and then from the first operative configuration to the third operative configuration.

In this embodiment, the moving direction of the target object, such as a human body, can be determined according to the change trend of the plurality of distance values within the preset duration. If the change trend is a descending trend, it indicates that the human body moves towards the air conditioner, and in such a case, the air output assembly is controlled to switch from the third operative configuration to the first operative configuration and then from the first operative configuration to the second operative configuration. If the change trend is an ascending trend, it indicates that the human body moves away from the air conditioner, and in such a case, the air output assembly is controlled to switch from the second operative configuration to the first operative configuration and then from the first operative configuration to the third operative configuration, to avoid the output air blowing directly on the human body.

The method for controlling an air conditioner further comprises: determining that the ambient temperature is within the range of the preset temperature, and controlling the air output assembly to switch from the second operative configuration or the third operative configuration to the first operative configuration.

When the ambient temperature is within the range of the preset temperature, it indicates that the cooling or heating effect has been achieved currently, and the air output assembly is controlled to switch to the first operative configuration to ensure "windless feeling" to the largest extent to improve the user experience.

Figure 11:
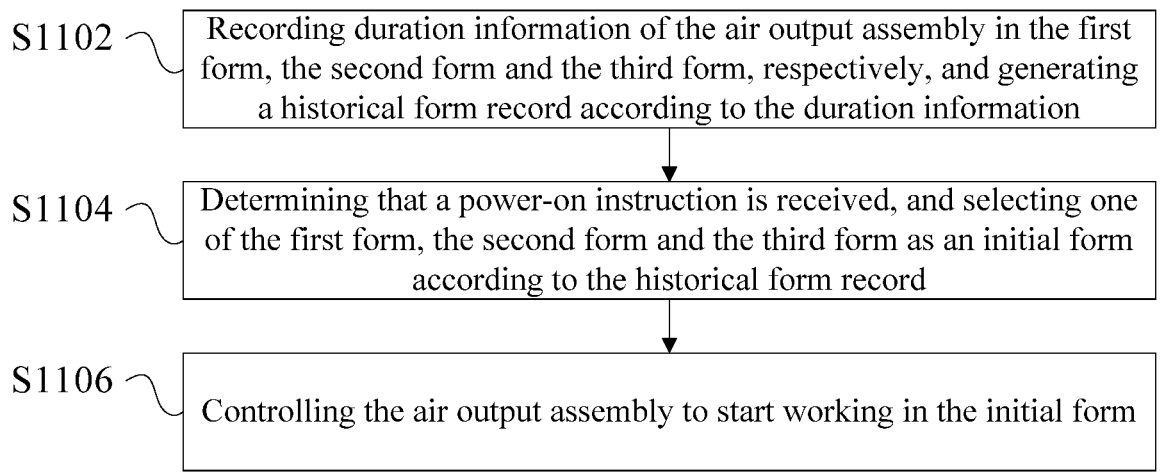
FIG. 11 is a still further flowchart of the method.

As shown in FIG. 11, in an embodiment of the present disclosure, the method for controlling an air conditioner further comprises:

- step S1102, recording duration information of the air output assembly in the first form, the second operative configuration and the third operative configuration, respectively, and generating a historical operative configuration record according to the duration information;
- step S1104, determining that a power-on instruction is received, and selecting one of the first operative configuration, the second operative configuration and the third operative configuration as an initial operative configuration according to the historical operative configuration record; and
- step S1106, controlling the air output assembly to start working in the initial operative configuration.

In this embodiment, the air conditioner generates a historical operative configuration record according to the duration information corresponding to the operative configuration in which the air output assembly is, and the most frequently used operative configuration of the user can be acquired according to the historical operative configuration record. When the user turns on the air conditioner again, the operative configuration with the longest use time by the user is taken as the initial operative configuration by default, and the air output assembly is controlled to work in the initial operative configuration, which can ensure, to the largest extent, that the air output mode of the air conditioner matches the user's usage habits, thus improving the use experience of the user.

Figure 12:
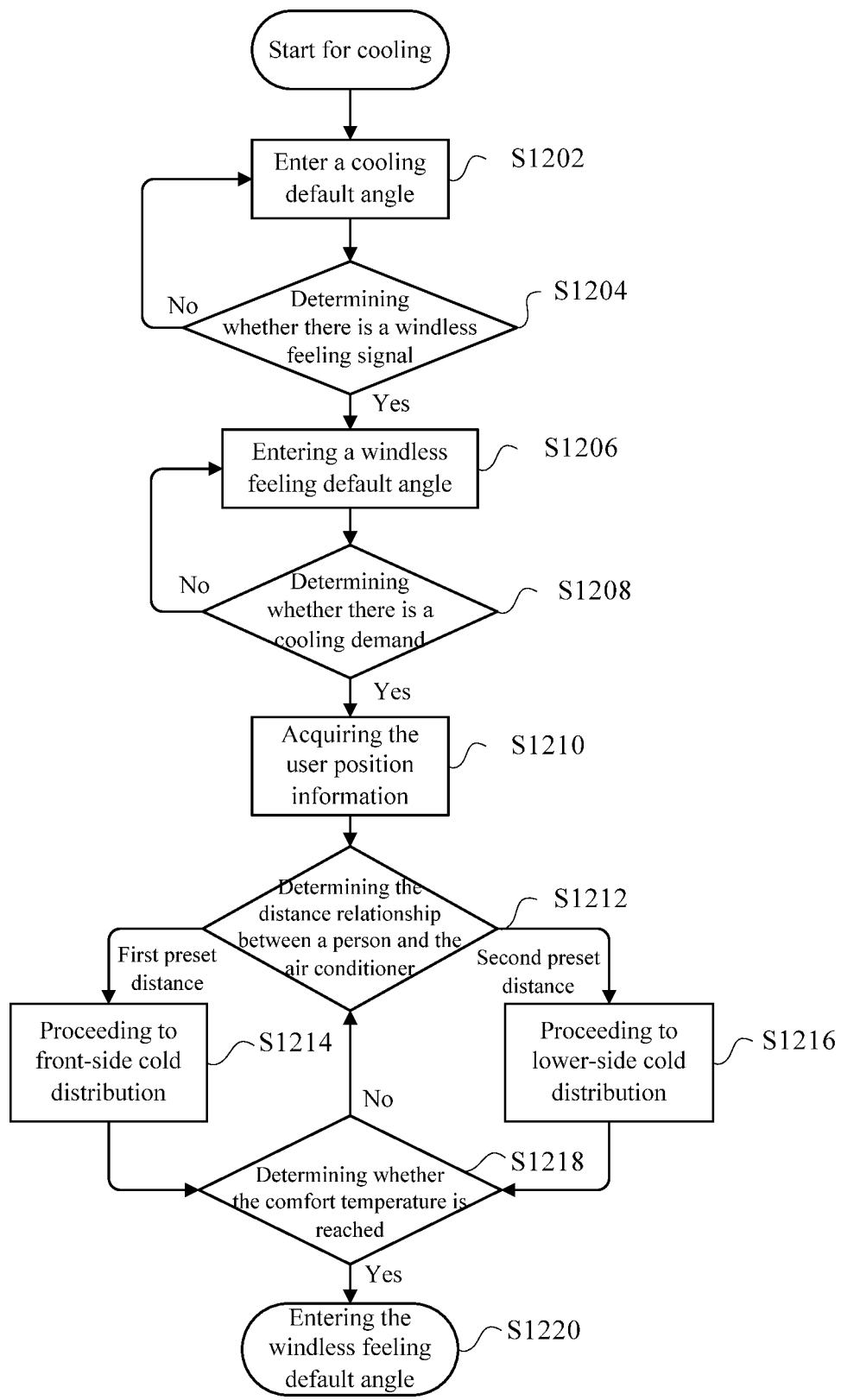
FIG. 12 is a still further flowchart of the method.

In an embodiment of the present disclosure, the overall logic of the windless feeling control is as shown in FIG. 12:

- after starting for cooling, performing step S1202 to enter the cooling default angle;
- step S1204, determining whether there is a windless feeling signal; if yes, proceeding to step S1206, otherwise, returning to step S1202;
- step S1206, entering the windless feeling default angle;
- step S1208, determining whether there is a cooling demand; if yes, proceeding to step S1210, otherwise, returning to step S1206;
- step S1210, acquiring the user position information;
- step S1212, determining the distance relationship between a person and the air conditioner; if the first preset distance is satisfied, proceeding to step S1214, and if the second preset distance is satisfied, proceeding to step S1216;
- step S1214, proceeding to front-side cold distribution;
- step S1216, proceeding to lower-side cold distribution;
- step S1218, determining whether the comfort temperature is reached; if yes, proceeding to step S1220, otherwise, returning to S1212; and step S1220, entering the windless feeling default angle.

In an embodiment of the present disclosure, there is provided a computer-readable storage medium on which a computer program is stored, when the computer program is executed by a processor, the method for controlling an air conditioner as provided in any of the above embodiments is implemented. Therefore, the computer-readable storage medium includes all the beneficial effects of the method for controlling an air conditioner as provided in any of the above embodiments, which will not be repeated here.

In the description of the present disclosure, the term "a plurality of" means two or more, unless otherwise explicitly defined, the orientation or position relationships indicated by the terms "upper", "lower" and the like are the orientation or position relationships based on what is shown in the drawings, are merely for the convenience of describing the present disclosure and simplifying the description, and do not indicate or imply that the device or element referred to must have a particular orientation and is constructed and operated in a specific orientation, and thus cannot be understood as the limitation on the present disclosure; and the terms "connection", "mounting", "fixing" and the like should be understood in a broad sense, for example, "connection" may be a fixed connection, and may also be a removable connection, or an integral connection; and may also be direct connection and may also be indirect connection through an intermediary. A person of ordinary skills in the art could understand the specific meaning of the terms in the present disclosure according to specific situations.

In the description of the present disclosure, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the present disclosure, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. An air conditioner comprising:
an air conditioner body provided with an air outlet;
an air output assembly, configured to adjust air output of the air outlet, the air output assembly being provided with a plurality of operative configurations, wherein the air output assembly comprises an air diffusing assembly configured to shield or open the air outlet, and to allow airflow to pass through and diffusing the passing airflow;
a detection device, configured to acquire a distance value of a target object from the air conditioner; and
a controller, being electrically connected to the air output assembly and the detection device and controlling, according to the distance value, the air output assembly to switch among the plurality of operative configurations.

2. The air conditioner according to claim 1, wherein the plurality of operative configurations include a first operative configuration, and the air conditioner further comprises:
a communication interface electrically connected to the controller and configured to receive a control instruction,
wherein the controller controls the air output assembly to work in the first operative configuration, according to the control instruction.

3. The air conditioner according to claim 2, wherein the plurality of operative configurations further include a second operative configuration and a third operative configuration, and the controller is further configured to:
acquire a first preset distance range and a second preset distance range;
determine that the distance value is within the first preset distance range and control the air output assembly to switch to the second operative configuration; and
determine that the distance value is within the second preset distance range and control the air output assembly to switch to the third operative configuration.

4. The air conditioner according to claim 3, wherein the air output assembly comprises:
a first air deflector arranged inside the air outlet and configured to rotate relative to an orientation of the air outlet to change an air output direction of the air outlet;
a second air deflector rotatably connected to the air conditioner body and configured to open or close the air outlet, the second air deflector being provided with a through hole for airflow to pass through, wherein:
the air diffusing assembly is connected to the air conditioner body and configured to move relative to the air conditioner body to shield or open the air outlet, the air diffusing assembly is formed with an air diffusing structure, and the air diffusing structure is configured to allow the airflow to pass through and diffusing the passing airflow.

5. The air conditioner according to claim 4, wherein the air diffusing structure comprises:
a plurality of wind wheels, the plurality of wind wheels being meshed and driven by a gear structure, the wind wheel comprising an inner rib and an outer ring rib, first blades and second blades being provided between the inner rib and the outer ring rib, the first blades being fixedly connected to the inner rib and the outer ring rib, the second blades being rotatably connected to the inner rib, and the second blades having a first operative position and a second operative position;
wherein when the second blades are in the first operative position, the second blades and the first blades are arranged at intervals; and when the second blades are in the second operative position, at least part of the second blades coincide with the first blades in an axial direction of the wind wheel.

6. The air conditioner according to claim 5, wherein the outer ring rib is provided with a positioning portion protruding towards the inner rib, and each one of the second blades is provided with a convex rib corresponding to the positioning portion, when the second blades move to the first operative position, and the positioning portion abuts against the convex rib to limit the second blades.

7. The air conditioner according to claim 5, wherein for controlling, according to a control instruction, the air output assembly to work in the first operative configuration, the controller is further configured to:

control the air diffusing assembly to shield the air outlet,
control the second blades to move to the first operative position, and
control the first air deflector to rotate to a first angle.

8. The air conditioner according to claim 7, wherein for controlling the air output assembly to switch to the second operative configuration, the controller is further configured to:
control the second blades to move to the second operative position, and
control the first air deflector to rotate from the first angle to a second angle.

9. The air conditioner according to claim 8, wherein for controlling the air output assembly to switch to the third operative configuration, the controller is further configured to:
control the first air deflector to rotate from the first angle to a third angle;
wherein:
the first air deflector rotates to the first angle or the second angle, and the first air deflector directs the air blown out of the air outlet to the air diffusing assembly; and
the first air deflector rotates to the third angle, and the first air deflector directs the air blown out of the air outlet to the second air deflector.

10. The air conditioner according to claim 5, wherein:
when the air output assembly is in the first operative configuration, the air diffusing assembly shields the air outlet, the second air deflector rotates to abut against the air diffusing assembly, the first air deflector directs the air blown out of the air outlet to the air diffusing assembly, and the second blades is in the first operative position;
when the air output assembly is in the second operative configuration, the air diffusing assembly shields the air outlet, the second air deflector rotates to abut against the air diffusing assembly, the first air deflector directs the air blown out of the air outlet to the air diffusing assembly, and the second blades is in the second operative position; and
when the air output assembly is in the third operative configuration, the air diffusing assembly shields the air outlet, the second air deflector rotates to abut against the air diffusing assembly, the first air deflector directs the air blown out of the air outlet to the second air deflector, and the second blades is in the first operative position.

11. The air conditioner according to claim 4, wherein:
the second air deflector and the air diffusing assembly are assembled to define a cavity in the shape of an angle located on the outer side of the air outlet of the air conditioner and communicated with the air outlet of the air conditioner,
the cavity is formed with a side opening at both ends in a length direction of an assembly line between the second air deflector and the air diffusing assembly, and
the side openings are communicated with the cavity.

12. The air conditioner according to claim 4, wherein the detection device comprises at least one of:
a temperature sensor, an infrared distance detection device, an image recognition apparatus, and a radar position detection apparatus.

13. The air conditioner according to claim 3, wherein:
the detection device is further configured to acquire an ambient temperature, before the controller controls, according to the distance value, the air output assembly to switch among the plurality of operative configurations;
the controller acquires a preset difference and a preset temperature, and calculates a first difference between the ambient temperature and the preset temperature; and
when determining that the first difference is greater than the preset difference, the controller controls, according to the distance value, the air output assembly to switch among the plurality of operative configurations.

14. A method for controlling the air conditioner according to claim 1, the method comprising:
acquiring a distance value of a target object from the air conditioner; and
controlling, according to the distance value, the air output assembly of the air conditioner to switch among the plurality of operative configurations.

15. The method for controlling an air conditioner according to claim 14, wherein the air output assembly includes a first operative configuration, a second operative configuration and a third operative configuration, and the method further comprises:
receiving a control instruction, and controlling, according to the control instruction, the air output assembly to work in the first operative configuration;
controlling, according to the distance value, the air output assembly of the air conditioner to switch among the plurality of operative configurations by:
acquiring a first preset distance range and a second preset distance range;
determining that the distance value is within the first preset distance range and controlling the air output assembly to switch to the second operative configuration; and
determining that the distance value is within the second preset distance range and controlling the air output assembly to switch to the third operative configuration.

16. The method for controlling an air conditioner according to claim 15, wherein before the controlling, according to the distance value, the air output assembly of the air conditioner to switch among the plurality of operative configurations, the method further comprises:
acquiring an ambient temperature, and acquiring a preset difference and a preset temperature;
calculating a first difference between the ambient temperature and the preset temperature; and
when determining that the first difference is greater than the preset difference, performing the controlling, according to the distance value, the air output assembly to switch among the plurality of operative configurations.

17. The method for controlling an air conditioner according to claim 16, wherein the acquiring an ambient temperature comprises:
acquiring a corresponding first ambient temperature in a first preset distance range and acquiring a corresponding second ambient temperature in a second preset distance range; and
the method further comprises:
calculating a second difference between the first ambient temperature and the second ambient temperature;
determining that the second difference is positive and the second difference is greater than the preset difference, controlling the air output assembly to switch to the third operative configuration; and determining that the second difference is negative and an absolute value of the second difference is greater than the preset difference, controlling the air output assembly to switch to the second operative configuration.

18. The method for controlling an air conditioner according to claim 16, wherein:
the preset temperature is greater than or equal to 25° C. and less than or equal to 27° C.; and
the preset difference is greater than or equal to 1.5° C. and less than or equal to 3.5° C.

19. The method for controlling an air conditioner according to claim 16, further comprising:
determining that the ambient temperature is within the range of the preset temperature, and controlling the air output assembly to switch from the second operative configuration or the third operative configuration to the first operative configuration.

20. The method for controlling an air conditioner according to claim 16, further comprising:
recording duration information of the air output assembly in the first operative configuration, the second operative configuration and the third operative configuration, respectively, and generating a historical operative configuration record according to the duration information;
determining that a power-on instruction is received, and selecting one of the first operative configuration, the second operative configuration and the third operative configuration as an initial operative configuration according to the historical operative configuration record; and
controlling the air output assembly to start working in the initial operative configuration.

21. The method for controlling an air conditioner according to claim 15, wherein the controlling, according to the distance value, the air output assembly of the air conditioner to switch between the first operative configuration, the second operative configuration and the third operative configuration further comprises:

determining a change trend of the distance value according to a plurality of distance values acquired within a preset duration;
determining that the change trend is a descending trend, and controlling the air output assembly to switch from the third operative configuration to the first operative configuration and then from the first operative configuration to the second operative configuration; and
determining that the change trend is an ascending trend, and controlling the air output assembly to switch from the second operative configuration to the first operative configuration and then from the first operative configuration to the third operative configuration.

22. A computer-readable storage medium on which a computer program is stored, wherein when the computer program is executed by a processor, the method for controlling an air conditioner according to claim 14 is implemented.

23. An air conditioner comprising:
an air conditioner body provided with an air outlet;
an air output assembly, configured to adjust air output of the air outlet, the air output being provided with a plurality of operative configurations, wherein the air output assembly comprises an air deflector rotatably connected to the air conditioner body and configured to open or close the air outlet, the air deflector being provided with a through hole for airflow to pass through;
a detection device, configured to acquire a distance value of a target object from the air conditioner; and
a controller, being electrically connected to the air output assembly and the detection device and controlling, according to the distance value, the air output assembly to switch among the plurality of operative configurations.

* * * * *